(12) United States Patent
Smith et al.

(10) Patent No.: US 9,152,421 B2
(45) Date of Patent: Oct. 6, 2015

(54) ASSEMBLING LONG INSTRUCTION ENCAPSULATED IN SHORT INSTRUCTIONS ACCORDING TO METHOD IDENTIFIED BY FORMAT BITS

(75) Inventors: Peter Smith, Cambridgeshire (GB); David Richard Hargreaves, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 923 days.

(21) Appl. No.: 13/333,918

(22) Filed: Dec. 21, 2011

(65) Prior Publication Data
US 2012/0324207 A1 Dec. 20, 2012

(30) Foreign Application Priority Data
Dec. 24, 2010 (GB) .................................. 1021991.3

(51) Int. Cl.
*G06F 9/30* (2006.01)
(52) U.S. Cl.
CPC .......... *G06F 9/30152* (2013.01); *G06F 9/3017* (2013.01); *G06F 9/30185* (2013.01)
(58) Field of Classification Search
CPC ............ G06F 9/30181; G06F 9/30185; G06F 9/30145; G06F 9/30149; G06F 9/30; G06F 9/30178
USPC ................................ 712/E9.035, 210, E9.029
See application file for complete search history.

(56) References Cited

U.S. PATENT DOCUMENTS

| 4,680,698 | A | 7/1987 | Edwards et al. |
| 5,177,701 | A | 1/1993 | Iwasa |
| 5,303,358 | A | 4/1994 | Baum |
| 6,167,505 | A | 12/2000 | Kubota et al. |
| 6,253,314 | B1 | 6/2001 | Itoh |
| 6,651,160 | B1 | 11/2003 | Hays |
| 2001/0025337 | A1 | 9/2001 | Worrell et al. |
| 2002/0056035 | A1 | 5/2002 | Rozenshein et al. |
| 2005/0177707 | A1* | 8/2005 | Banerjee et al. ............... 712/226 |

OTHER PUBLICATIONS

UK Search Report dated Apr. 5, 2012, in corresponding GB application.

* cited by examiner

*Primary Examiner* — Kenneth Kim

(57) ABSTRACT

A method of encapsulating a long instruction in a set of short instructions for execution on a processor, the long instruction having k bits and each short instruction having l bits where l<k, includes assembling a first portion of the long instruction and a first identifier to form a first instruction of the set of short instructions; and assembling a second portion of the long instruction and a second identifier to form a second instruction of the set of short instructions; wherein at least one of the first and second identifiers is for identifying to the processor that the set of short instructions encapsulates the long instruction.

20 Claims, 2 Drawing Sheets

ASSEMBLING LONG INSTRUCTION ENCAPSULATED IN SHORT INSTRUCTIONS ACCORDING TO METHOD IDENTIFIED BY FORMAT BITS

BACKGROUND OF THE INVENTION

This invention relates generally to instruction set extensions for increased code density. In particular the invention relates to encapsulating long instructions from a full instruction set into a set of short instructions.

Reduced instruction set computing (RISC) processors typically have a fixed bit-width instruction size. Common sizes are 16-bits and 32-bits. 32-bits give flexibility in expressing instructions and operands but at the expense of typically larger code size than the 16-bit instruction sets.

Known reduced instruction sets consist of a subset of the full instruction set. In particular often these reduced instruction sets exclude any instructions which are longer than 16 bits. Reduced instruction sets therefore consist of the more simple (low level) instructions of the full instruction sets.

A problem with reduced instruction sets is that some specific (high level) instructions for which the hardware of a processor might be optimised cannot be expressed in short instructions because they are longer than the length of a short instruction. An example of such a specific instruction is a Fast Fourier Transform instruction which the hardware of a digital signal processor (DSP) might be optimised to execute. In such cases a combination of low level, fundamental instructions may be able to produce the same result as the specific instruction. However, because many low level instructions will need to be executed to achieve the same result as the specific instruction, the operation will be much slower than if long instructions had been used.

Another problem with the use of reduced instruction sets is that a separate compiler must be designed and manufactured for the reduced instruction set as compared to the compiler that is used for the corresponding long instruction set. This delays the time in between developing the reduced instruction set and being able to make chips available to the market which use the reduced instruction set.

Some existing processors (for example those developed by ARM and MIPS) are able to execute both (i) full instruction sets which use long instructions, and (ii) reduced instruction sets which use short instructions. This functionality enables long instructions to be used for specific high-level instructions, and otherwise short instructions to be used. However, these processors are complex because they must be able to receive and process both full instruction sets and reduced instruction sets.

There is a need for a method of assembling instruction sets which enables fast processing of both low-level fundamental instructions and high-level specific instructions whilst not significantly increasing complexity.

SUMMARY OF THE INVENTION

According to a first aspect, there is provided a method of encapsulating a long instruction in a set of short instructions for execution on a processor, the long instruction having k bits and each short instruction having l bits where l<k, the method comprising: assembling a first portion of the long instruction and a first identifier to form a first instruction of the set of short instructions; and assembling a second portion of the long instruction and a second identifier to form a second instruction of the set of short instructions; wherein at least one of the first and second identifiers is for identifying to the processor that the set of short instructions encapsulates the long instruction.

Suitably, each of the k bits of the long instruction is included in the set of short instructions.

Suitably, the first identifier is for identifying to the processor that the set of short instructions encapsulates the long instruction, and the second identifier is for identifying to the processor that the second instruction is integral with another instruction.

Suitably, the method further comprises assembling a third portion of the long instruction and a third identifier to form a third instruction of the set of short instructions.

Suitably, the first identifier is for identifying to the processor that the set of short instructions encapsulates the long instruction, the second identifier is for identifying to the processor that the second instruction is integral with another instruction, and the third identifier is for identifying to the processor that the third instruction is integral with another instruction.

Suitably, the method further comprises assembling a fourth portion of the long instruction and a fourth identifier to form a fourth instruction of the set of short instructions.

Suitably, the first identifier is for identifying to the processor that the set of short instructions encapsulates the long instruction, the second identifier is for identifying to the processor that the second instruction is integral with another instruction, the third identifier is for identifying to the processor that the third instruction is integral with another instruction, and the fourth identifier is for identifying to the processor that the fourth instruction is integral with another instruction.

Suitably, the long instruction has 32 bits and each short instruction has 16 bits.

According to a second aspect, there is provided an encapsulating processor arranged to encapsulate a long instruction in a set of short instructions for execution on an executing processor, the long instruction having k bits and each short instruction having l bits where l<k, the encapsulating processor arranged to: assemble a first portion of the long instruction and a first identifier to form a first instruction of the set of short instructions; and assemble a second portion of the long instruction and a second identifier to form a second instruction of the set of short instructions; wherein at least one of the first and second identifiers is for identifying to the executing processor that the set of short instructions encapsulates the long instruction.

Suitably, each of the k bits of the long instruction is included in the set of short instructions.

Suitably, the first identifier is for identifying to the processor that the set of short instructions encapsulates the long instruction, and the second identifier is for identifying to the processor that the second instruction is integral with another instruction.

Suitably, the encapsulating processor is arranged to encapsulate long instructions having 32 bits in a set of short instructions, each short instruction having 16 bits.

According to a third aspect, there is provided a method of executing a set of short instructions which encapsulate a long instruction on a processor, the long instruction having k bits and each short instruction having l bits where l<k, each short instruction being formed of an identifier and a portion of the long instruction, the method comprising: reading a first identifier in a first instruction of the set of short instructions; determining that the first identifier identifies that the set of short instructions encapsulate the long instruction; storing the portion of the long instruction encapsulated in the first instruction; storing the portions of the long instruction encapsulated in each further instruction of the set of short instructions; and assembling the stored portions of the long instruction to form the long instruction.

Suitably, each of the k bits of the long instruction is included in the set of short instructions.

Suitably, the method further comprises reading an identifier of each further instruction of the set of short instructions; and determining that the identifier of each further instruction of the set of short instructions identifies that that further instruction is integral with another instruction.

Suitably, the set of short instructions consists of a first, second and third instruction.

Suitably, the set of short instructions consists of a first, second, third and fourth instruction.

Suitably, the long instruction has 32 bits and each short instruction has 16 bits.

According to a fourth aspect, there is provided a executing processor arranged to execute a set of short instructions which encapsulate a long instruction, the long instruction having k bits and each short instruction having l bits where l<k, each short instruction being formed of an identifier and a portion of the long instruction, the executing processor being arranged to: read a first identifier in a first instruction of the set of short instructions; determine that the first identifier identifies that the set of short instructions encapsulates the long instruction; store the portion of the long instruction encapsulated in the first instruction; store the portions of the long instruction encapsulated in each further instruction of the set of short instructions; and assemble the stored portions of the long instruction to form the long instruction.

Suitably, each of the k bits of the long instruction is included in the set of short instructions.

Suitably, the executing processor is further arranged to read an identifier of each further instruction of the set of short instructions; and determine that the identifier of each further instruction of the set of short instructions identifies that that further instruction is integral with another instruction.

Suitably, the executing processor is arranged to execute short instructions having 16 bits which encapsulate a long instruction having 32 bits.

BRIEF DESCRIPTION OF THE DRAWINGS

The following disclosure will now be described by way of example with reference to the accompanying drawings. In the drawings.

DETAILED DESCRIPTION OF THE INVENTION

Known reduced instruction sets are unable to express those instructions from a full instruction set which have more bits than the number of bits in each short instruction used in the reduced instruction sets. The following discussion describes a reduced instruction set which enables any long instruction from a full instruction set to be expressed in the short instructions used in the reduced instruction set. By way of example the following discussion describes 32-bit long instructions and 16-bit short instructions. However, it is to be understood that the disclosure extends to long instructions and short instructions having different numbers of bits. More specifically, the following disclosure extends to long instructions having k bits and short instructions having l bits, where l<k.

In the following examples, the reduced instruction set enables long 32-bit instructions to be conveyed via short 16-bit instructions by encapsulating each long instruction within a series of short 16-bit instructions.

Figure 1:
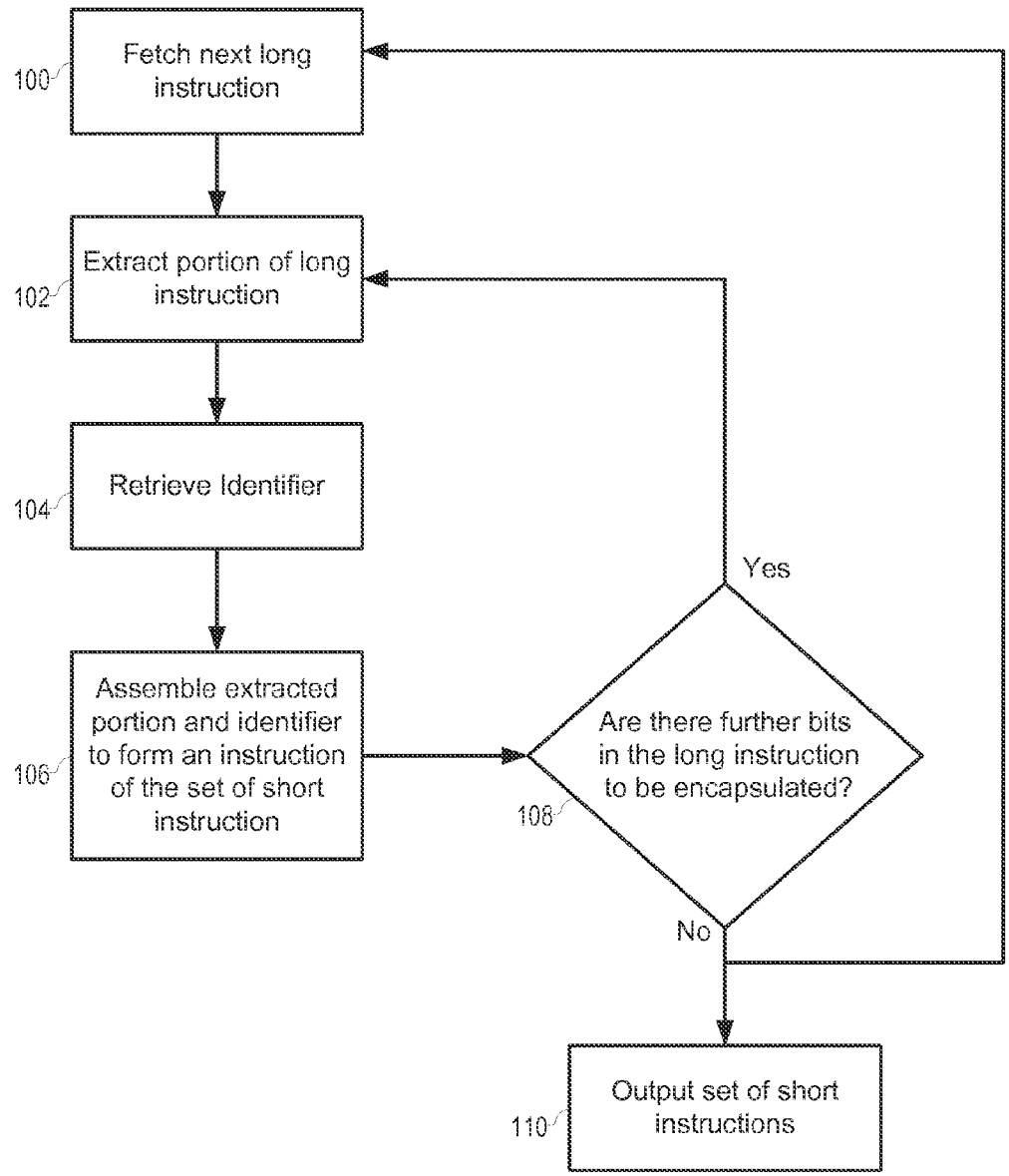
FIG. 1 is a flow diagram illustrating the method by which a processor encapsulates a long instruction into a set of short instructions.

FIG. 1 illustrates in general terms the method by which a processor encapsulates a long instruction into a set of short instructions. At step 100 the processor fetches the next long instruction. At step 102 the processor extracts a portion of the long instruction which is to be included in the first short instruction. At step 104 the processor retrieves an identifier from an identifier store to be included in the first short instruction. At step 106 the processor assembles the extracted portion of the long instruction and the identifier to form the first short instruction. At step 108 a determination is made as to whether there are further bits of the long instruction to be encapsulated in the set of short instructions. If the answer is YES then the process returns to step 102 where another portion of the long instruction is extracted. The process then repeats as already explained to form a second short instruction. Further short instructions may also be formed until it is determined that there are no further bits in the long instruction to be encapsulated. If the answer at step 108 is NO then the set of short instructions encapsulating the long instruction is determined to be complete and the set of short instructions is outputted at step 110. The process returns to step 100 at which point the next long instruction is fetched.

The identifier of at least one of the short instructions of the set of short instructions is suitable for identifying to a processor receiving the set of short instructions that that set of short instructions encapsulates a long instruction. For example, that identifier may include a sequence of bits that the receiving processor is configured to interpret as meaning that the short instruction is one of a set of short instructions that encapsulates a long instruction. The receiving processor is then able to process the short instruction and those accompanying it in the set of short instructions accordingly.

The identifier of at least one of the short instructions in the set of short instructions is suitable for identifying to a processor receiving the set of short instructions that the instruction is integral with another instruction. Suitably, the identifier is suitable for identifying to a processor that the short instruction of which it forms a part is integral with at least one other instruction in the set of short instructions. This identifier may be suitable for identifying a particular other instruction in the set of short instructions with which the instruction of which it forms a part is integral. The identifier may be suitable for identifying more than one other instruction in the set of short instructions with which the instruction of which it forms a part is integral.

Generally in a set of short instructions: one short instruction has an identifier for identifying to a processor receiving the set of short instructions that that set of short instructions encapsulates a long instruction; and the remaining short instructions each have an identifier for identifying to the processor that the instruction is integral with another instruction.

The following detailed examples describe an instruction set which consists of 16-bit short instructions. These instructions can be grouped into three classes:

1) short instructions which are prefixes;
2) short instructions which are not prefixes but which are associated with one or more short instructions which are prefixes; and
3) short instructions which are isolated full instructions A prefix is an instruction which is associated with another instruction. A prefix is integral with another instruction. A prefix may be an instruction which forms a part of another instruction. A prefix may take one of many forms. For example, a prefix may include bits which are to be incorporated into the bits of another instruction. A prefix may include bits which are interpreted by an executing processor as altering the meaning of another instruction.

The third class above refers to those instructions from a full instruction set which have 16 or fewer bits and are therefore able to be expressed within a single short instruction.

In the example instruction set illustrated in the following examples, a short instruction is identifiable as a prefix by its identifier. In the example instruction set, the identifier of a prefix constitutes the first 4 bits of the prefix. These first 4 bits are 1111. In a different example instruction set the identifier of a prefix could constitute a different number and/or different location of bits in the prefix.

In the example instruction set illustrated in the following examples, a short instruction is identifiable as being one of a set of short instructions that encapsulates a long instruction by its identifier. In the example instruction set, the identifier of such an instruction constitutes the first 8 bits of the instruction. These first 8 bits are 01001101. This identifier indicates that the remaining portion of the short instruction is part of the encapsulated long instruction. In other words, the remaining 8 bits of the 16-bit short instruction are 8 bits of the encapsulated 32-bit long instruction. A short instruction comprising this identifier belongs to the second class above, i.e. a short instruction which is not a prefix but which is associated with one or more short instructions which are prefixes. The prefixes with which this instruction is associated encapsulate the remaining bits of the encapsulated long instruction. In a different example instruction set the identifier of this instruction could constitute a different number and/or different location of bits in the instruction.

EXAMPLE 1

Consider the long instruction 0x91E20100

This 32-bit long instruction is encapsulated into three 16-bit short instructions. These three short instructions include two prefixes and an instruction from the second class listed above which will be called the "main instruction" from here on. These three instructions are as follows:
prefix 1: 0xF100
prefix 2: 0xFE20
main instruction: 0x4D91

Each prefix starts with 0xF which is the bit sequence 1111. These four bits indicate that the short instruction is a prefix. The remaining 12 bits of prefix 1 are 12 bits of the long instruction. These are the first 12 consecutive bits of the long instruction. The remaining 12 bits of prefix 2 are 12 bits of the long instruction. These are the second 12 consecutive bits of the long instruction. The main instruction starts with 0x4D which is the bit sequence 01001101. This identifier indicates that the remaining portion of the short instruction is part of the encapsulated long instruction. The remaining 8 bits of the main instruction are 8 bits of the long instruction. These are the last 8 consecutive bits of the long instruction.

All 32 bits of the long instruction have been encapsulated within a set of three short instructions of the example reduced instruction set.

EXAMPLE 2

Consider the long instruction 0x02007135

This 32-bit long instruction is an example of a 32-bit instruction which can be expressed using less than 32 bits. The long instruction may be encapsulated into two 16-bit short instructions. These two short instructions include a prefix and a main instruction. The two instructions are as follows:
prefix: 0xF135
main instruction: 0x4D72

The prefix starts with 0xF which is the bit sequence 1111. These four bits indicate that the short instruction is a prefix. The remaining 12 bits of the prefix are 12 bits of the long instruction. These are the first 12 consecutive bits of the long instruction. The main instruction starts with 0x4D which is the bit sequence 01001101. This identifier indicates that the remaining portion of the short instruction is part of the encapsulated long instruction. The remaining 8 bits of the main instruction are 8 bits of the long instruction. This means that 20 of the 32 bits of the long instruction are described explicitly in the set of two short instructions. The remaining 12 bits of the 32 bits of the long instruction are deduced by the executing processor according to a predetermined method.

In the example instruction set, format bits are used to identify to the executing processor that a predetermined method is to be used to assemble the long instruction from the set of short instructions. In the example instruction set there are two format bits which indicate that the long instruction is to be assembled using one of four predetermined methods depending on the bit values of the format bits. These format bits are in a specific location in the main instruction. Specifically, the two format bits are in bit locations in the main instruction which corresponds to bit locations [25:24] of the long instruction. These format bits indicate that the set of short instructions encapsulates a long instruction. The format bits are used by the executing processor to identify the method that is to be used to unpack the 20 bits provided into 32 bits.

In this example, the format bits are '10'. The processor interprets these format bits as an indication to select the following predetermined conversion method:
short instructions: 0xFPQR, 0x4DS2 convert to
long instruction: 0x0200SPQR A further factor which may be used to determine which predetermined conversion method is to be used is the number of prefixes to the main instruction. For example, in the above example the predetermined conversion method is suitably selected based on (i) the fact that there is one prefix, and (ii) the specific bit values of the format bits. In this example the 32-bit long instruction has been encapsulated within a set of two short instructions of the example reduced instruction set by incorporating 20 of the 32 bits of the long instruction into the set of short instructions.

EXAMPLE 3

Consider the long instruction 0xFD00FFFC and an accompanying long prefix instruction 0xF10F0000

These two 32-bit long instructions can be encapsulated into four 16-bit short instructions. These four short instructions include three prefixes and a main instruction. These four instructions are as follows:
prefix 1: 0xFFFC
prefix 2: 0xF000
prefix 3: 0xF0F0
main instruction: 0x4DF1

Each prefix starts with 0xF which is the bit sequence 1111. These four bits indicate that the short instruction is a prefix. The remaining 12 bits of prefix 1 are 12 bits of the long instruction. These are the first 12 consecutive bits of the long instruction. The remaining 12 bits of prefix 2 are 12 bits of the accompanying long prefix instruction. These are the first 12 consecutive bits of the accompanying long prefix instruction. The remaining 12 bits of prefix 3 are 12 bits of the accompanying long prefix instruction. These are the second 12 consecutive bits of the accompanying long prefix instruction. The main instruction starts with 0x4D which is the bit sequence 01001101. This identifier indicates that the remaining portion of the short instruction is part of an encapsulated long instruction. The remaining 8 bits of the main instruction are 8 bits of the accompanying long prefix instruction. These are the last 8 consecutive bits of the accompanying long prefix instruction. The remaining 20 bits of the 32 bits of the long instruction are deduced by the executing processor according to a predetermined method. This predetermined method may involve using sign extension. Additionally, in this example instruction set the predetermined method also involves using knowledge that in the example long instruction set 32-bit prefix instructions always begin with 0xFD00.

In this example the two 32-bit long instructions have been encapsulated within a set of four short instructions of the example reduced instruction set by incorporating 44 of the 64 bits of the long instructions into the set of short instructions.

Depending on how many bits of a 32-bit long instruction are used to express the full instruction, two, three or four 16-bit short instructions are used to encapsulate the full instruction.

For a long instruction having k bits, each bit of the k bits may be included in the set of short instructions encapsulating the long instruction. Alternatively a subset of the k bits may be included in the set of short instructions encapsulating the long instruction. If the full instruction is short enough that it can fit into a single 16-bit instruction then there is no need for encapsulation. In this case the full instruction is packed into a single 16-bit instruction.

This disclosure also relates to an encapsulating processor which is arranged to encapsulate long instructions into sets of short instructions as detailed above. The encapsulating processor is arranged to perform the method of FIG. 1.

Figure 2:
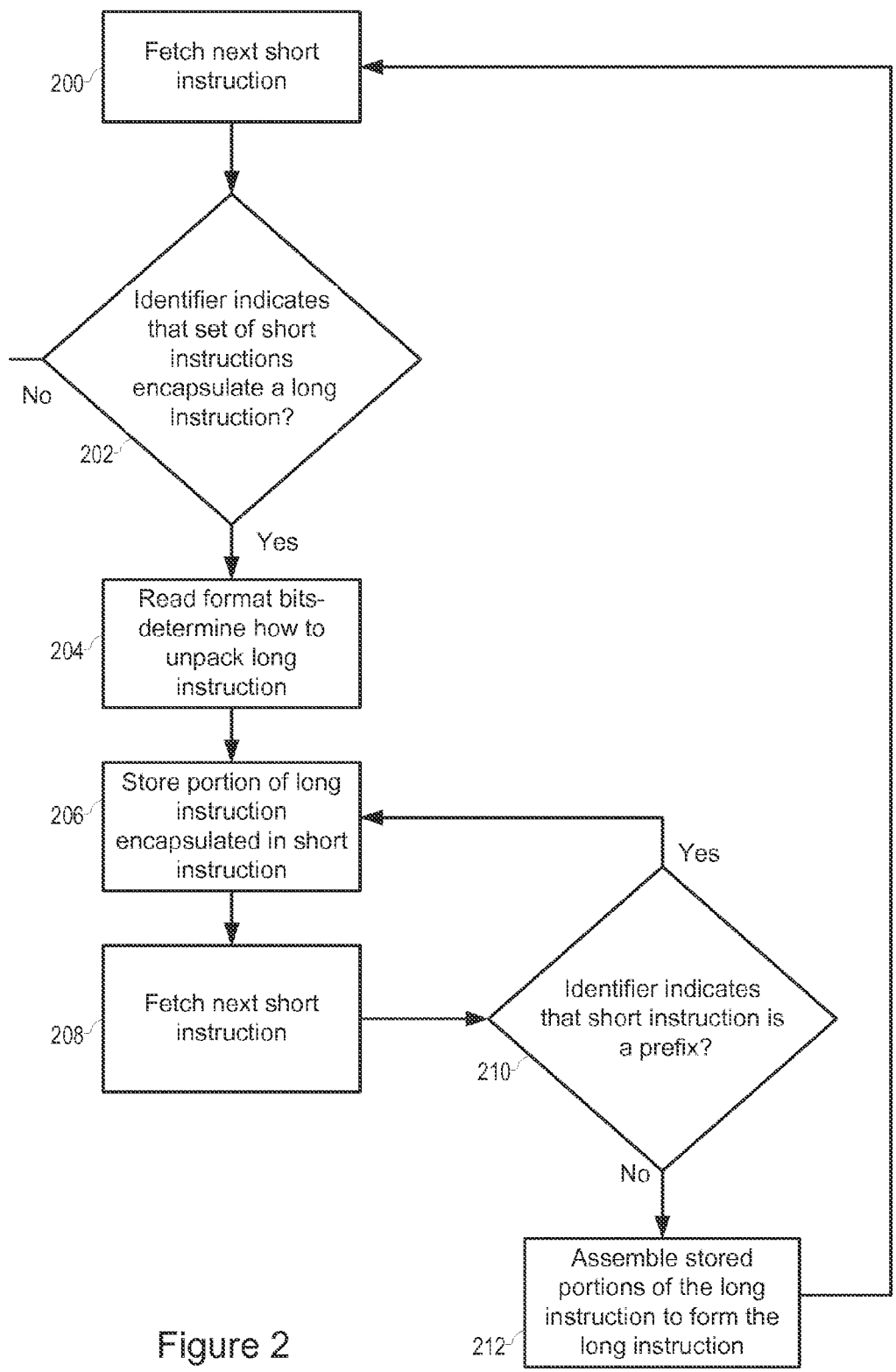
FIG. 2 is a flow diagram illustrating the method by which a processor executes a set of short instructions which encapsulate a long instruction.

FIG. 2 illustrates in general terms the method by which a processor extracts a long instruction from a set of short instructions into which it is encapsulated. At step 200 the processor fetches the next short instruction. At step 202 a determination is made as to whether an identifier in the short instruction indicates that it is one instruction of a set of short instructions which encapsulate a long instruction. If the answer is NO then there is no encapsulated long instruction to be unpacked and the processor continues to execute the instruction as per known methods. If an identifier is read and the answer is YES then the process continues to step 204 where the format bits of the instruction are read in order to determine the method to be used to unpack the long instruction from the set of short instructions. At step 206 the portion of the long instruction encapsulated in the short instruction is extracted and stored. At step 208 the next short instruction is fetched. At step 210 a determination is made as to whether an identifier in the short instruction indicates that the short instruction is a prefix. In other words a determination is made as to whether an identifier in the short instruction indicates that the short instruction is integral with another instruction. If the answer is YES then the portion of the long instruction encapsulated in the short instruction is extracted and stored at step 206. The next short instruction is then fetched at step 208 and the determination of step 210 made again. This cycle of fetching a short instruction, determining that an identifier in the short instruction indicates that the short instruction is a prefix, and storing the portion of the long instruction encapsulated in the short instruction repeats until a short instruction is fetched which is not determined to be a prefix. If the short instruction is not a prefix then this indicates that all of the short instructions in the set of short instructions which encapsulate the long instruction have been fetched, and the portions of the long instruction encapsulated in the set of short instructions extracted and stored. If the answer to the determination at step 210 is NO then the process proceeds to step 212 where the stored portions of the long instruction are assembled to form the long instruction. The processor then returns to step 200 to fetch the next short instruction. The next time the processor fetches a short instruction which has an identifier which indicates to the processor that it is one of a set of short instructions that encapsulates a long instruction then the long instruction is extracted from the set of short instructions as described above.

After the encapsulated 32-bit long instruction has been extracted and assembled the processor executes the long instruction as if it had been received in a 32-bit instruction.

If not all 32 bits of the 32-bit long instruction are included in the set of short instructions then the executing processor uses a predetermined method to unpack the 32-bit long instruction from the set of short instructions. As mentioned above, this method is indicated to the processor by the format bits in the main instruction of the set of short instructions. The executing processor may apply this method as it extracts and stores the portions of the long instruction from the set of short instructions, such that all 32 bits of the long instruction are stored. Alternatively, the portions of the long instruction may be stored in the form they are extracted from the short instructions, and then the executing processor applies this method as it assembles the stored portions of the long instruction to form the long instruction.

This disclosure also relates to an executing processor which is arranged to execute a set of short instructions which encapsulate a long instruction. The executing processor is arranged to perform the method of FIG. 2.

Known reduced instruction sets are unable to express those instructions from a full instruction set which have more bits that the number of bits in each short instruction used in the reduced instruction sets. Known reduced instruction sets therefore consist only of a sub-set of the full instruction set. The reduced instruction set laid out herein is able to express any long instruction from a full instruction set in the short instructions used in the reduced instruction set. This enables a user of the reduced instruction set to access all the instructions of the full instruction set, even hardware-optimised specific instructions. This is the case even though those hardware-optimised specific instructions are generally more than 16 bits long. An example of a digital signal processor-specific long instruction which can be expressed in the reduced instruction set is a parallel indexed memory access with increment of index register. In such an instruction, the memory access can be executed in parallel with an add/subtract operation.

Usefully, the methods described herein do not require that a separate compiler is used for the reduced instruction set. The compiler for the full instruction set can be used. The machine code output of the full instruction set compiler is transformed to the short instructions of the reduced instruction set as described above. This enables processors using the reduced instruction set to be made available to the market quicker than if a separate compiler had to be developed for the reduced instruction set before the processor could be released. A compiler optimised for the reduced instruction set can be released at a later time.

A 32-bit long instruction which has been encapsulated using the techniques described herein can be extracted and consumed in a single clock cycle by the executing processor. In known reduced instruction set methods a 32-bit long instruction can only be expressed as a large number of low level, fundamental short instructions. It takes an executing processor a long time to process this large number of instructions. Additionally, in known reduced instruction set methods only one 16-bit instruction is consumed per single clock cycle. The reduced instruction set described herein can therefore be used to process long instructions much quicker than known reduced instruction sets.

The methods and processors described above may also process instructions quicker than full 32-bit instruction set methods because some code which is intended for full instruction set methods actually runs faster when expressed in reduced instruction sets, for example those instructions which are short enough to fit in one 16-bit instruction. A long instruction which fits into a 16-bit short instruction (i.e. the instructions of class 3) also takes a single clock cycle to consume.

Preferably the encapsulating processor is implemented in hardware. Optionally, the encapsulating processor is implemented in software.

Preferably the executing processor is implemented in hardware. Optionally, the executing processor is implemented in software.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method of encapsulating a long instruction in a set of short instructions for execution on a processor, the long instruction having k bits and each short instruction having l bits where l>k, the method comprising:
   assembling in a memory accessible by said processor a first portion of the long instruction and a first identifier to form a first instruction of the set of short instructions; and
   assembling in a memory accessible by said processor a second portion of the long instruction, a second identifier and a format identifier to form a second instruction of the set of short instructions;
   wherein at least one of the first and second identifiers is for identifying to the processor that the set of short instructions encapsulates the long instruction and wherein the format identifier identifies to the processor a predefined conversion method for assembling the long instruction from the set of short instructions.

2. A method as claimed in claim 1, wherein each of the k bits of the long instruction is included in the set of short instructions.

3. A method as claimed in claim 1, wherein the first identifier is for identifying to the processor that the set of short instructions encapsulates the long instruction, and the second identifier is for identifying to the processor that the second instruction is integral with another instruction.

4. A method as claimed in claim 1, further comprising assembling a third portion of the long instruction and a third identifier to form a third instruction of the set of short instructions.

5. A method as claimed in claim 4, wherein the first identifier is for identifying to the processor that the set of short instructions encapsulates the long instruction, the second identifier is for identifying to the processor that the second instruction is integral with another instruction, and the third identifier is for identifying to the processor that the third instruction is integral with another instruction.

6. A method as claimed in claim 4, further comprising assembling a fourth portion of the long instruction and a fourth identifier to form a fourth instruction of the set of short instructions.

7. A method as claimed in claim 6, wherein the first identifier is for identifying to the processor that the set of short instructions encapsulates the long instruction, the second identifier is for identifying to the processor that the second instruction is integral with another instruction, the third identifier is for identifying to the processor that the third instruction is integral with another instruction, and the fourth identifier is for identifying to the processor that the fourth instruction is integral with another instruction.

8. An encapsulating processor arranged to encapsulate a long instruction in a set of short instructions for execution on an executing processor, the long instruction having k bits and each short instruction having l bits where l<k, the encapsulating processor arranged to:
   assemble in a memory accessible by said processor a first portion of the long instruction and a first identifier to form a first instruction of the set of short instructions; and
   assemble in a memory accessible by said processor a second portion of the long instruction, a second identifier and a format identifier to form a second instruction of the set of short instructions;
   wherein at least one of the first and second identifiers is for identifying to the executing processor that the set of short instructions encapsulates the long instruction and wherein the format identifier identifies to the executing processor a predefined conversion method for assembling the long instruction from the set of short instructions.

9. An encapsulating processor as claimed in claim 8, wherein each of the k bits of the long instruction is included in the set of short instructions.

10. An encapsulating processor as claimed in claim 8, wherein the first identifier is for identifying to the processor that the set of short instructions encapsulates the long instruction, and the second identifier is for identifying to the processor that the second instruction is integral with another instruction.

11. An encapsulating processor as claimed in claim 8 arranged to encapsulate long instructions having 32 bits in a set of short instructions, each short instruction having 16 bits.

12. A method of executing on a processor a set of short instructions stored in a memory which encapsulate a long instruction stored in a memory, the long instruction having k bits and each short instruction having l bits where l<k, each short instruction being formed of an identifier and a portion of the long instruction, the method comprising:
   reading a first identifier in a first instruction of the set of short instructions;
   determining that the first identifier identifies that the set of short instructions encapsulate the long instruction;
   storing the portion of the long instruction encapsulated in the first instruction;
   storing the portions of the long instruction encapsulated in each further instruction of the set of short instructions;
   reading a format identifier in the set of short instructions and using the format identifier to identify a predefined conversion method for assembling the long instruction from the set of short instructions; and
   assembling the stored portions of the long instruction to form the long instruction using the identified method.

13. A method as claimed in claim 12, wherein each of the k bits of the long instruction is included in the set of short instructions.

14. A method as claimed in claim 12, further comprising reading an identifier of each further instruction of the set of short instructions; and determining that the identifier of each further instruction of the set of short instructions identifies that that further instruction is integral with another instruction.

15. A method as claimed in claim 12, wherein the set of short instructions consists of a first, second and third instruction.

16. A method as claimed in claim 12, wherein the set of short instructions consists of a first, second, third and fourth instruction.

17. An executing processor arranged to execute a set of short instructions stored in a memory, which encapsulate a long instruction stored in a memory, the long instruction having k bits and each short instruction having l bits where l<k, each short instruction being formed of an identifier and a portion of the long instruction, the executing processor being arranged to:
   read a first identifier in a first instruction of the set of short instructions;
   determine that the first identifier identifies that the set of short instructions encapsulates the long instruction;
   store the portion of the long instruction encapsulated in the first instruction;
   store the portions of the long instruction encapsulated in each further instruction of the set of short instructions;
   read a format identifier in the set of short instructions and use the format identifier to identify a predefined conversion method for assembling the long instruction from the set of short instructions, and
   assemble the stored portions of the long instruction to form the long instruction using the identified method.

18. An executing processor as claimed in claim 17, wherein each of the k bits of the long instruction is included in the set of short instructions.

19. An executing processor as claimed in claim 17, the executing processor being further arranged to read an identifier of each further instruction of the set of short instructions; and
   determine that the identifier of each further instruction of the set of short instructions identifies that that further instruction is integral with another instruction.

20. An executing processor as claimed in claim 17, arranged to execute short instructions having 16 bits which encapsulate a long instruction having 32 bits.

* * * * *